United States Patent
Perrone et al.

(10) Patent No.: US 11,871,125 B2
(45) Date of Patent: Jan. 9, 2024

(54) METHOD OF PROCESSING A SERIES OF EVENTS RECEIVED ASYNCHRONOUSLY FROM AN ARRAY OF PIXELS OF AN EVENT-BASED LIGHT SENSOR

(71) Applicant: PROPHESEE, Paris (FR)

(72) Inventors: Daniele Perrone, Noisy le Grand (FR); Xavier Lagorce, Saint Maur des Fosses (FR); Vitor Schambach Costa, Paris (FR); Ludovic Chotard, Saint-Egrève (FR); Sylvain Brohan, Le Perreux sur Marne (FR)

(73) Assignee: PROPHESEE, Paris (FR)

( * ) Notice: Subject to any disclaimer, the term of this patent is extended or adjusted under 35 U.S.C. 154(b) by 92 days.

(21) Appl. No.: 17/430,141

(22) PCT Filed: Feb. 10, 2020

(86) PCT No.: PCT/EP2020/053366
§ 371 (c)(1),
(2) Date: Aug. 11, 2021

(87) PCT Pub. No.: WO2020/165106
PCT Pub. Date: Aug. 20, 2020

(65) Prior Publication Data
US 2022/0100658 A1 Mar. 31, 2022

(30) Foreign Application Priority Data
Feb. 11, 2019 (EP) .................... 19156323

(51) Int. Cl.
*H04N 23/80* (2023.01)
*H04N 25/40* (2023.01)
*H04N 25/443* (2023.01)

(52) U.S. Cl.
CPC ............. *H04N 23/80* (2023.01); *H04N 25/40* (2023.01); *H04N 25/443* (2023.01)

(58) Field of Classification Search
CPC .. H04N 5/23229; H04N 5/341; H04N 5/3454; H04N 5/91; H04N 5/378
(Continued)

(56) References Cited

U.S. PATENT DOCUMENTS 5,687,131 A * 11/1997 Spaderna ............ G06F 12/0891
365/230.01
9,628,777 B2 4/2017 Benosman et al.
(Continued)

FOREIGN PATENT DOCUMENTS

EP 3 518 529 A1 7/2019
EP 3 690 736 A1 8/2020
(Continued)

OTHER PUBLICATIONS

Alonso et al., "EV-SegNet: Semantic Segmentation for Event-Based Cameras," 2019 IEEE/CVF Conference on Computer Vision and Pattern Recognition Workshops (CVPRW), Long Beach, CA, USA, Jun. 16-17, 2019, 10 pages.
(Continued)

*Primary Examiner* — Lin Ye
*Assistant Examiner* — Chan T Nguyen
(74) *Attorney, Agent, or Firm* — Seed IP Law Group LLP

(57) ABSTRACT

The method processes a series of events received asynchronously from an array of pixels of an event-based light sensor. Each event of the series comprises an address of a pixel of the array from which the event is received, and an attribute value depending on incident light sensed by that pixel. The method comprises: storing a data structure in a first memory, the data structure including event data for at least some of the pixels of the array, the event data for a pixel being related
(Continued)

to at least one event most recently received from said pixel; during a timeslot, building, in a second memory having a faster access than the first memory, a map for the pixels of the array as the events of the series are received, the map including an information element for each pixel of the array, the information element having one of a plurality of values including a nil value indicating an absence of event during the timeslot; and updating the data structure after the timeslot using the map.

26 Claims, 2 Drawing Sheets

(58) Field of Classification Search
USPC .................................................. 348/222.1
See application file for complete search history.

(56) References Cited

U.S. PATENT DOCUMENTS

| | | | |
|---|---|---|---|
| 2004/0070678 A1* | 4/2004 | Toyama | G06F 16/58 |
| | | | 707/E17.026 |
| 2006/0092320 A1* | 5/2006 | Nickerson | H04N 7/0125 |
| | | | 348/E7.012 |
| 2008/0135731 A1 | 6/2008 | Lichtsteiner et al. | |
| 2010/0182468 A1 | 7/2010 | Posch et al. | |
| 2015/0235338 A1* | 8/2015 | Alla | G06F 11/0721 |
| | | | 345/522 |
| 2016/0080670 A1 | 3/2016 | Rangan et al. | |
| 2019/0362256 A1* | 11/2019 | Lang | G06N 7/01 |

FOREIGN PATENT DOCUMENTS

| | | | | |
|---|---|---|---|---|
| WO | 2013/093378 A1 | 6/2013 | | |
| WO | 2016/146938 A1 | 9/2016 | | |
| WO | WO2016146938 | * | 9/2016 | ........... H04N 13/296 |

OTHER PUBLICATIONS

Posch et al., "Retinomorphic Event-Based Vision Sensors: Bioinspired Cameras With Spiking Output," *Proceedings of the IEEE 102*(10):1470-1484, Oct. 2014.

Kogler et al., "Event-Based Stereo Matching Approaches for Frameless Address Event Stereo Data," ISVC 2011, Part 1, LNCS 6938, pp. 674-685, 2011.

Lichtsteiner et al., "A 128x128 120 dB 15 μs Latency Asynchronous Temporal Contrast Vision Sensor," IEEE Journal of Solid-State Circuits, vol. 43, No. 2, Feb. 2008, pp. 566-576.

Posch et al., "A QVGA 143 dB Dynamic Range Frame-Free PWM Image Sensor With Lossless Pixel-Level Video Compression and Time-Domain CDS," IEEE Journal of Solid-State Circuits, vol. 46, No. 1, Jan. 2011, pp. 259-275.

Rogister et al., "Asynchronous Event-Based Binocular Stereo Matching," IEEE Transactions on Neural Networks and Learning Systems, vol. 23, No. 2, Feb. 2012, pp. 347-353.

* cited by examiner

METHOD OF PROCESSING A SERIES OF EVENTS RECEIVED ASYNCHRONOUSLY FROM AN ARRAY OF PIXELS OF AN EVENT-BASED LIGHT SENSOR

The present invention relates to machine vision, especially to a method of processing a series of events received asynchronously from an array of pixels of an event-based light sensor.

BACKGROUND

Machine vision is a field that includes methods for acquiring, processing, analyzing and understanding images for use in many types of applications such as for example security applications (e.g., surveillance, intrusion detection, object detection, facial recognition, etc.), environmental-use applications (e.g., lighting control), object detection and tracking applications, automatic inspection, process control, and robot guidance etc. Therefore, machine vision can be integrated with many different systems.

In the art, the above-mentioned applications are achieved by using framed-based image sensors, which acquire the visual information from the scene either sequentially for each sensor element (pixel) or each pixel line/column or, in various patterns, pixel parallel, but always time-sampled at some limited frame rate. Therefore, the framed-based image sensors have limits in many applications, such as in rendering fast motion and stereo matching.

Event-based sensors have been developed, so as to overcome limitations of the framed-based image sensor. Instead of capturing an image with all the pixels at the same time and trying to compensate for the artifacts and suppress information, an event-based image sensor acquires the temporal luminance profile sensed by each pixel from the scene viewed by the sensor. Event-based sensors can capture fast changing information in a visual scene due to the high temporal resolution of the information individually acquired by the pixels. More details of such an event-based machine vision technology is discussed in the article Posch, C., Serrano-Gotarredona, T., Linares-Barranco, B., & Delbruck, T. (2014), "Retinomorphic event-based vision sensors: bioinspired cameras with spiking output", Proceedings of the IEEE, 102(10), 1470-1484.

As the event-based sensors output asynchronous events, some representation of the stream of events is needed for enabling various applications. Such representation cannot be the same as the 'frames' used in conventional cameras.

In general, for each pixel of the sensor, some data is stored about one or more events received from the pixel during a time window. Such data can include histogram data, i.e. how many events were received from the pixel during the time window, the timestamp of the most recent event received from the pixel, etc. The data can be stored in two channels to distinguish events of positive or negative polarities, i.e. indicating increasing or decreasing light intensity sensed by the pixels. More sophisticated data types can be stored, such as the one disclosed in "EV-SegNet: Semantic Segmentation for Event-based Cameras", I. Alonso and A. C. Murillo, arXiv:1811.12039v1, 29 Nov. 2018.

A data structure thus derived from the stream of events can encode spatial relationship between events because it can be accessed using the pixel addresses. It is typically stored in a RAM (random-access memory) associated with the processor handling the incoming stream of events. The processor receives the events in chronological order from pixels of the array that are not spatially correlated. This means that access to the RAM takes place every time an event is received, which consumes a lot of processing resources. Local memory schemes, such as caching, cannot be conveniently used.

A new approach is needed for processing event-based data so as to improve efficiency in the use of computing resources, especially regarding memory access.

SUMMARY

A method of processing a series of events received asynchronously from an array of pixels of an event-based light sensor is proposed. Each event of the series comprises an address of a pixel of the array from which the event is received, and an attribute value depending on incident light sensed by said pixel. The method comprises:

- storing a data structure including event data for at least some of the pixels of the array, the event data for a pixel being related to at least one event most recently received from said pixel;
- during a timeslot, building a map for the pixels of the array as the events of the series are received, the map including an information element for each pixel of the array, the information element having one of a plurality of values including a nil value indicating an absence of event during the timeslot; and
- updating the data structure after the timeslot using the map.

Grouping events in timeslots has the fundamental benefit of removing any chronological order within the group. Therefore it allows the use of more convenient orderings for computational and architectural needs.

Typically, the timeslot is relatively short, e.g. less than 2 milliseconds. Once it is ended, the map is used to update the data structure. Since the addressing scheme for both the map and the data structure is based on pixel locations (not on chronological order of events), the update can be made efficiently using appropriate memory architectures in relation to the processor(s) in charge of carrying out the method. Memory regions where the data structure is stored are accessed to be updated in batches. The number of memory accesses is drastically reduced, even if the timeslot is short.

Typically, the data structure is stored in a first memory and the map is built in a second memory having a faster access than the first memory.

For example, the memory where the map is built can be a local memory while the data structure is stored in a global memory. The local memory may also be referred to as a level-1 (L1) memory or an on-chip memory. In one possible embodiment, the global memory is a random access memory, RAM, memory and the local memory is a cache memory.

Without limitation, updating the data structure after the timeslot using the map may comprise accessing to the stored data structure in a raster scan order.

The timeslot may have its duration adapted based on events received from an array of pixels.

In an embodiment, updating the data structure after the timeslot using the map comprises changing the event data for each pixel for which the map has an information element with a value other than the nil value.

For instance, changing the event data for a pixel may comprise setting event data for the pixel by referring to a timestamp defined for the timeslot. In this case, some temporal accuracy is lost because event timing variations within a timeslot are ignored. However, it is not harmful to the application if the timeslot duration is suitably selected.

Referring to a timestamp defined for the timeslot has the advantageous effect of reducing noise on the timestamps of the events In an embodiment, building the map during a timeslot comprises:
- initializing the map with the nil value of the information element for all the pixels of the array;
- upon receiving an event during the timeslot from a pixel for which the information element included in the map has the nil value, setting the value of the information element included in the map for said pixel based on the attribute value of the received event; and
- outputting the map when the timeslot ends.

Building the map during a timeslot may further comprise, upon receiving an event during the timeslot from a pixel for which the information element included in the map has a value other than the nil value, setting the value of the information element included in the map for said pixel based on the attribute value of the received event.

If the attribute value of an event received from a pixel of the array comprises a polarity of the event having a first value, such as +1, when light sensed by said pixel increases and a second value, such as −1, when light sensed by said pixel decreases, the information element included in the map for a pixel from which an event is received during the timeslot may comprise the polarity of that event.

If the attribute value of an event received from a pixel of the array comprises a measure of light intensity sensed by said pixel, the information element included in the map for a pixel from which an event is received during the timeslot may comprise an element depending on the measure of light intensity of that event.

Another aspect of the present invention relates to a processor for coupling to an array of pixels of an event-based light sensor. The processor is configured to implement a method as defined above for processing a series of events received asynchronously from the array of pixels.

Another aspect of the present invention relates to a method of 3D reconstruction of a scene. The method comprises:
- putting at least first and second event-based light sensors in front of the scene at spatially separated locations, the first event-based light sensor having an array of pixels providing a first series of events, and the second event-based light sensor having an array of pixels providing a second series of events;
- processing each of the first and second series of events by a method as defined above to obtain first and second data structures, respectively; and
- stereo matching pairs of events respectively received from the first and the second event-based light sensors using the first and second data structures.

BRIEF DESCRIPTION OF THE DRAWINGS

Other features and advantages of the present invention will appear in the description hereinafter, in reference to the appended drawings, where.

DESCRIPTION OF EMBODIMENTS

Figure 1:
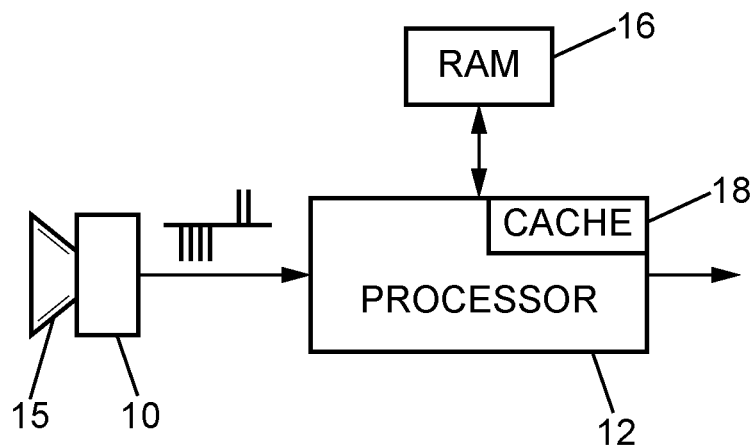
FIG. 1 is a block diagram of a device adapted to implementation of the invention.

The apparatus shown in FIG. 1 comprises an event-based asynchronous vision sensor 10 placed facing a scene and receiving light from the scene through optics for acquisition 15 comprising one or several lenses. The sensor 10 is placed in the image plane of the optics for acquisition 15. It comprises an array of sensing elements, such as photosensitive elements, organized into a matrix of pixels. Each sensing element corresponding to a pixel produces successive events depending on variations of light in the scene.

A processor 12 processes the information originating from the sensor 10, i.e. the sequences of events received, for example asynchronously, from the various pixels. It can be implemented by programming using a suitable programming language. A hardware implementation of the processor 12 using specialized logic circuits (ASIC, FPGA, . . . ) is also possible.

The apparatus further comprises at least first and second memories 16, 18 which, in the illustrative example shown in FIG. 1, are respectively a RAM 16 coupled to the processor chip through a bus and an on-chip memory area 18 managed according to a cache scheme by the processor 12. The two memories 16, 18 may be accessed at different speeds by the central processing unit (CPU) of the processor 12, i.e. access to the second memory 18 is faster than access to the first memory 16. It will be appreciated that other memory architectures and technologies are possible in the context of the present invention. For example the two memories 16, 18 can be external to the processor chip. Alternatively they can be both part of the same processor chip.

The first memory 16, hereafter referred as a RAM without limitation, is used to store relatively large amounts of data to be written and/or read by the processor 12. The second memory 18, hereafter referred as a cache memory without limitation, stores temporarily a more limited amount of data to which faster access is needed by the processor 12. It typically has a smaller storage size than the RAM 16 due to its performance and cost.

The processor 12 shown in FIG. 1 and the memories are embodied separately from the event-based sensor 10. Alternative architectures are possible. In particular, part or all of the processing illustrated in FIG. 2 can be performed in the same component as the event-based sensor 10, in an on-chip architecture. It is also possible to split the tasks between more than one processors operating sequentially or in parallel.

For each sensing element, i.e. pixel, the sensor 10 generates an event-based signal sequence depending on the variations of light received by the pixel from the scene that appears in the field of vision of the sensor.

The asynchronous sensor 10 carries out an acquisition to output a signal which, for each pixel, may be in the form of a succession of instants $t_k$ (k=0, 1, 2, . . . ) at which an activation threshold Q is reached. Each time this luminance increases by a quantity equal to the activation threshold Q starting from what it was in time $t_k$, a new instant $t_{k+1}$ is identified and a spike is emitted at this instant $t_{k+1}$. Symmetrically, each time that the luminance observed by the pixel decreases by the quantity Q starting from what it was in time $t_k$, a new instant $t_{k+1}$ is identified and a spike is emitted at this instant $t_{k+1}$. The signal sequence for the pixel includes a succession of spikes positioned over time at instants $t_k$ depending on the light profile for the pixel. Without limitation, the output of the sensor 10 is then in the form of an address-event representation (AER). In addition, the signal sequence typically includes a luminance attribute corresponding to a variation of incident light.

The activation threshold Q can be fixed, or can be adapted as a function of the luminance. For example, the threshold can be compared to the variations in the logarithm of the luminance for generating events when exceeded.

By way of example, the sensor 10 can be a dynamic vision sensor (DVS) of the type described in "A 128×128 120 dB 15 μs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a human retina (minimum duration between the action potentials) can be approached with a DVS of this type. The dynamic behavior surpasses that of a conventional video camera that has a limited sampling frequency. When a DVS is used as the event-based sensor 10, data pertaining to an event originating from a pixel include the address of the pixel, a time of occurrence of the event and a luminance attribute corresponding to a polarity of the event, e.g. +1 if the luminance increases and −1 if the luminance decreases.

Another example of an asynchronous sensor 10 that can be used advantageously in the context of this invention is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275. When an ATIS is used as the event-based sensor 10, data pertaining to an event originating from a pixel include the address of the pixel, a time of occurrence of the event and a luminance attribute corresponding to an estimated value of the absolute luminance. The polarity of each event can also be output by the ATIS.

The processing method disclosed herein makes use of a data structure, stored in the first memory or RAM 16, which includes event data for part or all of the pixels of the array of the sensor 10.

For a given pixel, the event data are related to the most recent event. They may also be related to a number of events most recently received from that pixel. For example, the event data may relate to N most recent events from the pixel where N is a fixed positive integer. The event data may relate to any events received from the pixel within a window of fixed duration T ending at the current time. The parameter T can be fixed (e.g. T=10 milliseconds as an illustration) or adaptive, locally or globally, as a function of the events generated by the array. The parameter T can be different for different regions of the pixel array, so as to be variable as a function of the incoming light sensed by the pixels across the array.

Thus, at any point in time, the data structure keeps track of the recent events that may be useful for a signal processing application making use of the event-based sensor.

By way of example, the data structure may contain one or more of the following items forming the event data for a pixel having an address expressed as an index i, and coordinates $(x_i, y_i)$ in the array:
- timestamp $t_i$ of each most recent event $ev(i, t_i)$ received from the address i in the array;
- luminance value $L_i$ associated with the pixel at address i. In the case of an ATIS-type of sensor, or the like, the luminance value $L_i$ is available with the most recent event $ev(i, t_i)$ in the signal flow coming from the sensor;
- polarity $p_i$ of each most recent event $ev(i, t_i)$ originating from the pixel at address i. The polarity $p_i$ is generally available with the event $ev(i, t_i)$ in the signal flow coming from the sensor;
- flickering frequency estimated for the pixel at address i using the events $ev(i, t_i)$ recently received from that pixel. Such frequency information can be estimated, for example, using a method as disclosed in the European patent application No. 18305063.2;
- visual flow data estimated at position $(x_i, y_i)$ for the pixel at address i using the events $ev(i, t_i)$ recently received from that pixel and a neighborhood thereof. Such visual flow data can be estimated, for example, using a method as disclosed in WO 2013/093378 A1;
- depth value estimated for each most recent event $ev(i, t_i)$ originating from the pixel at address i. The depth value may also be expressed as a stereo disparity value. It can be obtained from the signal flows from two or more event-based sensors viewing the scene from different angles;
- a cluster ID associated with a cluster of events to which the most recent event $ev(i, t_i)$ originating from the pixel at address i is considered to belong;
- the above-mentioned parameter T representing the duration of the above-mentioned time window if that parameter T is allowed to vary from one pixel of the array to another.

Instead of directly storing the timestamp $t_i$ of an event $ev(i, t_i)$ received from the address i in the array, a possibility is to include in the event data a function of $t_i$, such as: $\sigma(i) = f(t_i, t_{cur})$ where $f$ is a function and $t_{cur}$ is the current time. The function $f$ can be an exponential decay with a parameter $\tau$, and the above formulation then becomes:

$$\sigma(i) = \exp[-(t_{cur} - t_i)/\tau]$$

Alternatively, the function $f$ can be:

$$\sigma(i) = t_i \text{ if } t_{cur} \leq t_i + \tau, \text{ and}$$

$\sigma(i) = (t_{cur} - \tau)$ if $t_{cur} > t_i + \tau$ (meaning no recent event from pixel i).

Some items of the event data are directly linked to one event, such as the timestamp the polarity $p_i$, the luminance value $L_i$ (if available with the events), depth value, cluster ID. Other optional items are computed based on recent events to be associated with the pixel position i, such as flickering frequency, visual flow data, etc. In general, computation of these other items need not be as fast as the time dynamics allowed by the event-based sensor 10. Their update frequency is application-dependent.

It will be appreciated that other kind of information can be included in the data structure, depending on the functionality provided by the event-based sensor itself and/or of processing performed on the event-based signal flow. The content of the data structure may also be adapted depending on the application making use of the present method.

Moreover, the data structure can be organized in two channels, one for positive polarity where the timestamps $t_i$ are stored for the most recent event(s) of positive polarity, and one for negative polarity where the timestamps $t_i$ are stored for the most recent event(s) of negative polarity.

Figure 2:
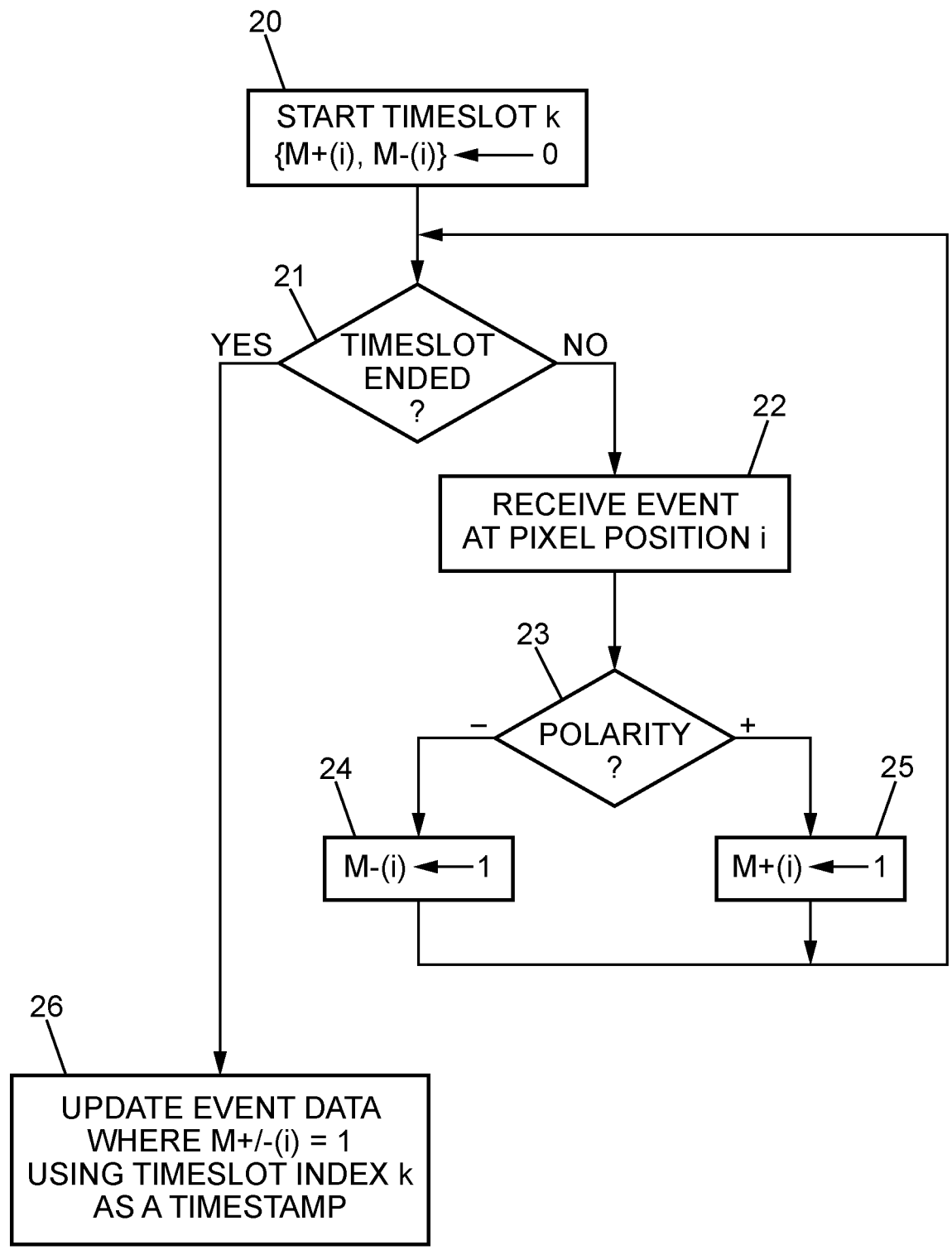
FIG. 2 is a flowchart of an illustrative method according to the invention.

In an example, FIG. 2 shows a flowchart of a method which can be carried out by the processor 12 to process a series of events received asynchronously from the array of pixels of the event-based light sensor 10.

In this method, reference is made to successive timeslots having a fixed duration $\Delta t$. The timeslots are denoted by an integer index k (k=1, 2, 3, . . . ). In each timeslot, a map is built in view of updating the event data stored in the data structure.

In the example of FIG. 2, the map consists of two channels and is generated as two respective bitmaps, one $\{M_+(i)\}$ for events of positive polarities and one $\{M_-(i)\}$ for events of negative polarities. At the end of the timeslot, $M_+(i)=0$ if no event of positive polarity was received from the pixel at address i during the timeslot and $M_+(i)=1$ otherwise, and $M_-(i)=0$ if no event of negative polarity was received from the pixel at address i during the timeslot and $M_-(i)=1$ otherwise. The map $\{(M_+(i), M_-(i))\}$ can then be used to update the event data after the timeslot. The information element $(M_+(i), M_-(i))$ of the map at a pixel position i having no event during the timeslot has a nil value $(M_+(i), M_-(i))=(0, 0)$.

The duration $\Delta t$ of the timeslot may be seen, without limitation, as the largest time interval such that two events happening at the same pixel within the interval are indistinguishable from a computational point of view. The duration $\Delta t$ then depends on characteristics of the sensor (such as jitter, noise, etc.) but also on characteristics of the signal processing algorithms for the subsequent applications making use of the data structure. Increasing $\Delta t$ causes some loss of temporal accuracy, but uses fewer computing resources and vice versa. A typical range for $\Delta t$ is between 250 μs and 2 ms.

An interesting option about the value of $\Delta t$ is to make it adaptive, i.e. to change it during the processing by some function on the past received data. This may be described using a Boolean function f(E)=true/false, where E is the set of the events received thus far in a current timeslot, and true/false indicates whether the current timeslot is finished and a new one should be started. In the case of a fixed timeslot of duration $\Delta t$, f(E) may be defined as f(E)=last_event_time−prev_timeslot_last_time>$\Delta t$. In an example of an adaptive case, the function f(E) defines a timeslot in terms of a fixed number of events N, i.e. f(E)=number_of_events_received_since_start_timeslot ≥ N. In other embodiments, the function f(E) may count events with some weights giving more importance to some regions of the pixel array (for example the center). It may also be learned by using machine learning algorithms.

The map $\{(M_+(i), M_-(i))\}$ is of a moderate size and therefore it can be generated by the processor 12 without accessing to the RAM 16, but by making use of the cache memory 18 (or some other more local and/or faster type of memory).

In FIG. 2, step 20 corresponds to the start of a timeslot k, at which the map $\{(M_+(i), M_-(i))\}$ is initialized as $(M_+(i), M_-(i))=(0, 0)$ for all pixels i. In an embodiment, the start of a timeslot k is at time k×$\Delta t$, i.e. the timeslots follow each other without interruption. Alternatively, the start of a timeslot k can be triggered by receipt of a first event from the array of pixels after the end of timeslot k−1.

In an ongoing timeslot k (whether $\Delta t$ has elapsed since step 20 is checked at test 21 in the illustration of FIG. 2), each event received from a pixel position i at step 22 causes setting the value 1 to $M_-(i)$ (negative polarity, step 24) or $M_+(i)$ (positive polarity, step 25) depending on the polarity of the event checked at test 23. When the end of the timeslot is detected at step 21, the map $\{(M_+(i), M_-(i))\}$ for timeslot k is output, i.e. it is made available in the cache memory 18 for the next step 26.

At step 24 or 25, it is possible to do the write operation $M_\pm(i)=1$ only if the value of $M_\pm(i)$ was previously 0. This does not change the resulting map because the method does not make any difference between two events of same polarity received within a timeslot.

After the end of the timeslot, the processor 12 proceeds to updating the event data of the data structure at the pixel positions i where the information element of the map does not have the nil value, i.e. $(M_+(i), M_-(i))\neq(0, 0)$. The update is done at step 26 by using the timeslot index k as a new timestamp $t_i$ associated with each pixel position i where $M_+(i)=1$ or $M_-(i)=1$.

Using the timeslot index k as a timestamp reduces the time resolution in the reception of the events. However, if the timeslot duration $\Delta t$ is selected small enough in view of the application making use of the data structure stored in the RAM 16, there is no disadvantage in the reduced time resolution. Inherent fluctuations in the operation of the pixel array, which cause noise and jitter, can be compensated through the use of discrete timeslot indexes k as timestamps.

The update 26 may be performed in batches, by accessing successively to spatial regions of the data structure from the RAM 16, reading the event data of each region into the cache memory 18, writing the timestamp $t_i$=k in the negative polarity channel if $M_-(i)=1$ and in the positive polarity channel if $M_+(i)=1$ and writing back the updated event data of the region into the RAM 16. This is much more efficient than accessing the RAM 16 every time an event is received.

In the simple case where only the timestamp of the most recent event of each polarity is stored as event data for a pixel i, the update 26 simply consists in writing $t_i$=k in the relevant polarity channel. If more than one event is memorized in the data structure for a pixel i and a given polarity, the new timestamp $t_i$=k is written and any previous timestamps for the same pixel are shifted in a FIFO manner.

In the above-discussed embodiment, the event data for a pixel i consists of two bits $M_+(i), M_-(i)$. If more than two bits per pixel are available in the cache-stored map, it is possible to encode more information at the time of receiving an event.

For example, in the case of an ATIS light sensor providing a luminance value $L_i$ together with each event, the luminance value, or a subsampled version thereof, can be stored in the map at step 24 or 25. This makes it possible for the event data to maintain a current value of the luminance for each pixel.

For certain applications, it may be enough to have only one bit in the information element of the map for a given pixel, indicating whether or not an event was received from that pixel during the timeslot, regardless of the event polarity.

There are many applications of the above-described method of maintaining the event data in the RAM 16 using a map stored in cache memory 18.

Figure 3:
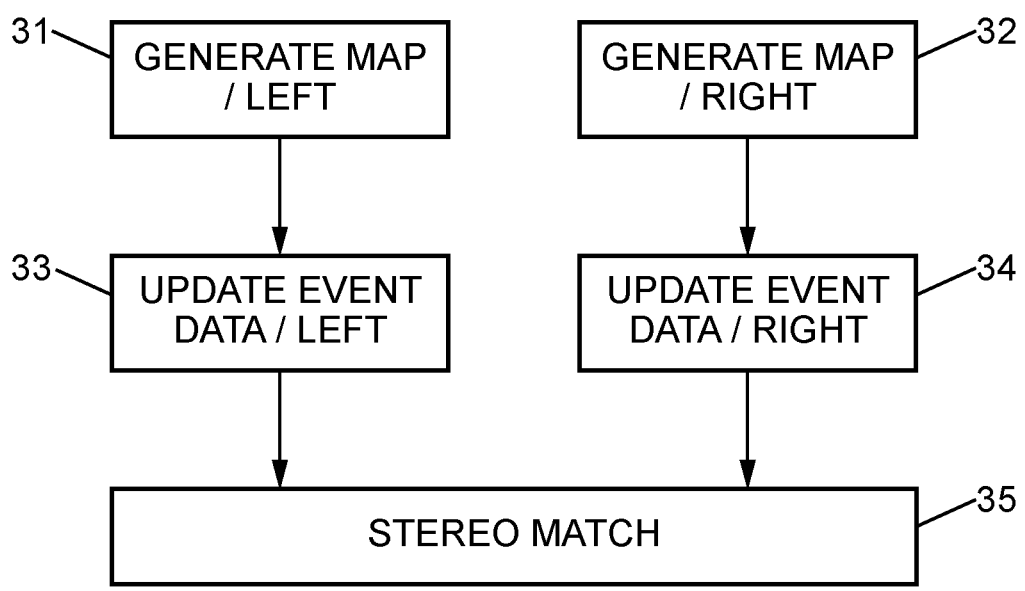
FIG. 3 is a flowchart of a stereo processing method according to the invention.

FIG. 3 illustrates an example of application to 3D stereo processing based on two event-based sensors. This application makes use of at least two event-based light sensors 10 placed in front of a scene at spatially separated locations. Here, one of the event-based light sensors 10 is referred to as a left camera, and the other one is referred to as a right camera.

The left camera produces a first series of events which is processed in accordance with a method such as the one described with reference to FIG. 2. The same method is applied to a second series of events produced by the right camera. The time axis is divided into timeslots k, and for each timeslot a respective map is generated from each of the first and second streams of series of events in stages 31 and 32 which may correspond to steps 20-25 shown in FIG. 2. The two maps are then used in steps 33 and 34 (corresponding to step 26 of FIG. 2) to obtain a first data structure for the left camera and a second data structure for the right camera.

Then, at step 35, the processor 12 performs stereo matching of pairs of events from the two cameras using the first and second data structures updated at steps 33, 34.

Stereo matching methods as disclosed in U.S. Pat. No. 9,628,777 B2 and in WO 2016/146938 A1 can be used in step 35. In these methods, events from one of the two cameras are considered and for each of these events from a given pixel, candidate events are checked along the epipolar line corresponding to the pixel in the array of the other camera. For each candidate event, a metric is computed and matching is validated with the best candidate, according to the metrics, if a criterion is satisfied (e.g. metrics within a threshold).

The use of maps calculated for successive timeslots also provides advantages in the implementation of the stereo matching step 35. After each timeslot, only the pixels whose information element does not have the nil value need to be considered for both cameras, because matched events are expected to be simultaneous. Considering factors like synchronization noise, jitter and scene dynamics, the concept of "simultaneous" events from two sensors is covered by events received within a same timeslot or within a limited number of consecutive timeslots, which limits the number of memory accesses that are needed. If the metrics used for stereo matching needs event data to be recovered from the data structure, the event data can be retrieved from the RAM 16 by groups of pixels disposed around the epipolar lines and matching can be performed in batches while limiting RAM memory accesses.

Once the stereo matching is done, depth values can be allocated to the pixels where the events were received in the last timeslot, and such depth values can be stored in the data structure in the RAM 16 to provide 3D positioning of the events.

Another possible example of the application is labeling connected components using event-based sensor. The data structure obtained by the present invention can be used to cluster events into connected components so as to extract and segment concerned objects in the image or scene for object detection and tracking. An exemplary example for such an application has been discussed in a European Patent Application, EP 19154401.4.

The above-described methods may be implemented using program instructions recorded in non-transitory computer-readable media to implement various operations which may be performed by a computer. The media may also include, alone or in combination with the program instructions, data files, data structures, and the like. The program instructions recorded on the media may be those specially designed and constructed for the purposes of the illustrative embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one.

Implementations of the invention may be used in many applications including computer human interaction (e.g., recognition of gestures, voice, posture, face, and/or other applications), controlling processes (e.g., an industrial robot, autonomous and other vehicles), following movements of a set of interest points or objects (e.g., vehicles or humans) in the visual scene and with respect to the image plane, augmented reality applications, virtual reality applications, access control (e.g., opening a door based on a gesture, opening an access way based on detection of an authorized person), detecting events (e.g., for visual surveillance or people or animal), counting, tracking, etc. Myriads of other applications exist that will be recognized by those of ordinary skilled in the art given the present disclosure.

The embodiments described hereinabove are illustrations of this invention. Various modifications can be made to them without leaving the scope of the invention which stems from the annexed claims.

The invention claimed is:

1. A method of processing a series of events received asynchronously from an array of pixels of an event-based light sensor,
   wherein each event of the series comprises an address of a pixel of the array from which the event is received, and an attribute value depending on incident light sensed by said pixel,
   the method comprising:
   storing a data structure including event data for at least some of the pixels of the array, the event data for a pixel being related to at least one event most recently received from said pixel;
   during a timeslot, building a map for the pixels of the array as the events of the series are received, the map including an information element for each pixel of the array, the information element having one of a plurality of values including a nil value indicating an absence of event during the timeslot, wherein the duration of the timeslot is at most a largest time interval such that two events happening at the same pixel within the time interval are indistinguishable from a computational point of view; and
   updating the data structure after the timeslot using the map.

2. The method of claim 1, wherein the data structure is stored in a first memory and the map is built in a second memory having a faster access than the first memory.

3. The method of claim 1, wherein the data structure is stored in a global memory and the map is built in a local memory.

4. The method of claim 3, wherein the global memory is a random access memory, RAM, memory while the local memory is a cache memory.

5. The method of claim 1, wherein updating the data structure after the timeslot using the map comprises accessing to the stored data structure in a raster scan order.

6. The method of claim 1, wherein the timeslot is at most 2 milliseconds long.

7. The method of claim 1, wherein the timeslot has a duration which is adapted based on events received from an array of pixels.

8. The method of claim 7, wherein changing the event data for a pixel comprises setting event data for said pixel by referring to a timestamp defined for the timeslot.

9. The method of claim 1, wherein updating the data structure after the timeslot using the map comprises changing the event data for each pixel for which the map has an information element with a value other than the nil value.

10. The method of claim 1, wherein building the map during a timeslot comprises:
    initializing the map with the nil value of the information element for all the pixels of the array;
    upon receiving an event during the timeslot from a pixel for which the information element included in the map has the nil value, setting the value of the information element included in the map for said pixel based on the attribute value of the received event; and outputting the map when the timeslot ends.

11. The method of claim 10, wherein building the map during a timeslot further comprises, upon receiving an event during the timeslot from a pixel for which the information element included in the map has a value other than the nil value, setting the value of the information element included in the map for said pixel based on the attribute value of the received event.

12. The method of claim 1, wherein the attribute value of an event received from a pixel of the array comprises a polarity of the event having a first value when light sensed by said pixel increases and a second value when light sensed by said pixel decreases, and wherein the information element included in the map for a pixel from which an event is received during the timeslot comprises the polarity of said event.

13. The method of claim 1, wherein the attribute value of an event received from a pixel of the array comprises a measure of light intensity sensed by said pixel, and wherein the information element included in the map for a pixel from which an event is received during the timeslot comprises an element depending on the measure of light intensity of said event.

14. A method of 3D reconstruction of a scene, the method comprising:

putting at least first and second event-based light sensors in front of the scene at spatially separated locations, the first event-based light sensor having an array of pixels providing a first series of events, and the second event-based light sensor having an array of pixels providing a second series of events;

processing each of the first and second series of events by a method as claimed in claim 1 to obtain first and second data structures, respectively; and stereo matching pairs of events respectively received from the first and the second event-based light sensors using the first and second data structures.

15. A processor for coupling to an array of pixels of an event-based light sensor, wherein the processor is configured to implement a method for processing a series of events received asynchronously from the array of pixels of the event-based light sensor, wherein each event of the series comprises an address of a pixel of the array from which the event is received, and an attribute value depending on incident light sensed by said pixel, the method comprising:

storing a data structure including event data for at least some of the pixels of the array, the event data for a pixel being related to at least one event most recently received from said pixel;

during a timeslot, building a map for the pixels of the array as the events of the series are received, the map including an information element for each pixel of the array, the information element having one of a plurality of values including a nil value indicating an absence of event during the timeslot, wherein the duration of the timeslot is at most a largest time interval such that two events happening at the same pixel within the time interval are indistinguishable from a computational point of view; and updating the data structure after the timeslot using the map.

16. The method of claim 15, wherein updating the data structure after the timeslot using the map comprises accessing to the stored data structure in a raster scan order.

17. The method of claim 15, wherein the timeslot is at most 2 milliseconds long.

18. The method of claim 15, wherein the timeslot has a duration which is adapted based on events received from an array of pixels.

19. The method of claim 18, wherein changing the event data for a pixel comprises setting event data for said pixel by referring to a timestamp defined for the timeslot.

20. The method of claim 15, wherein updating the data structure after the timeslot using the map comprises changing the event data for each pixel for which the map has an information element with a value other than the nil value.

21. A method of processing a series of events received asynchronously from an array of pixels of an event-based light sensor, wherein each event of the series comprises an address of a pixel of the array from which the event is received, and an attribute value depending on incident light sensed by said pixel, the method comprising:

storing a data structure including event data for at least some of the pixels of the array, the event data for a pixel being related to at least one event most recently received from said pixel;

during a timeslot, building a map for the pixels of the array as the events of the series are received, the map including an information element for each pixel of the array, the information element having one of a plurality of values including a nil value indicating an absence of event during the timeslot; and updating the data structure after the timeslot using the map;

wherein building the map includes:

initializing the map with the nil value of the information element for all the pixels of the array;

upon receiving an event during the timeslot from a pixel for which the information element included in the map has the nil value, setting the value of the information element included in the map for said pixel based on the attribute value of the received event; and outputting the map when the timeslot ends.

22. The method of claim 21, wherein updating the data structure after the timeslot using the map comprises accessing to the stored data structure in a raster scan order.

23. The method of claim 21, wherein the timeslot is at most 2 milliseconds long.

24. The method of claim 21, wherein the timeslot has a duration which is adapted based on events received from an array of pixels.

25. The method of claim 24, wherein changing the event data for a pixel comprises setting event data for said pixel by referring to a timestamp defined for the timeslot.

26. The method of claim 21, wherein updating the data structure after the timeslot using the map comprises changing the event data for each pixel for which the map has an information element with a value other than the nil value.

* * * * *